United States Patent
Priyanto et al.

(10) Patent No.: US 12,047,908 B2
(45) Date of Patent: Jul. 23, 2024

(54) METHODS FOR ENHANCING PAGING OPERATIONS, RELATED WIRELESS DEVICES AND RELATED NETWORK NODES

(71) Applicant: Sony Corporation, Tokyo (JP)

(72) Inventors: Basuki Priyanto, Lund (SE); Nafiseh Mazloum, Lund (SE); Anders Berggren, Lund (SE); Lars Nord, Lund (SE)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 17/276,806

(22) PCT Filed: Oct. 9, 2019

(86) PCT No.: PCT/SE2019/050991
§ 371 (c)(1),
(2) Date: Mar. 16, 2021

(87) PCT Pub. No.: WO2020/091643
PCT Pub. Date: May 7, 2020

(65) Prior Publication Data
US 2021/0360582 A1    Nov. 18, 2021

(30) Foreign Application Priority Data

Nov. 1, 2018   (SE) .................................... 1851367-1
Aug. 14, 2019  (SE) .................................... 1950932-2

(51) Int. Cl.
*H04W 68/02*   (2009.01)
*H04W 68/00*   (2009.01)

(52) U.S. Cl.
CPC ......... *H04W 68/02* (2013.01); *H04W 68/005* (2013.01)

(58) Field of Classification Search
CPC ........................... H04W 68/02; H04W 68/005
(Continued)

(56) References Cited

U.S. PATENT DOCUMENTS

2004/0093523 A1* 5/2004 Matsuzaki ............. G06F 21/10
                                                            726/10
2006/0242239 A1* 10/2006 Morishima .......... G06Q 10/107
                                                            709/204

(Continued)

FOREIGN PATENT DOCUMENTS

CN   101755475 A   6/2010
CN   101796874 A   8/2010
(Continued)

OTHER PUBLICATIONS

International Search Report and Written Opinion from corresponding International Application No. PCT/SE2019/050991, dated Jan. 23, 2020, 17 pages.
(Continued)

*Primary Examiner* — Mark G. Pannell
(74) *Attorney, Agent, or Firm* — Tucker Ellis LLP

(57) ABSTRACT

A method performed in a wireless device, for enhancing paging operations with a network node is disclosed. The method comprises determining a group identifier based on a paging occurrence parameter, wherein the group identifier is indicative of a subset of wireless devices belonging to a paging group paged at a same paging occasion.

19 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2010/0248749 | A1* | 9/2010 | Koo ....................... | H04W 60/00 455/458 |
| 2010/0272004 | A1* | 10/2010 | Maeda .................. | H04L 5/0007 370/312 |
| 2010/0317339 | A1* | 12/2010 | Koc ........................ | H04L 5/006 455/450 |
| 2011/0124365 | A1* | 5/2011 | Gresset ................. | H04W 48/10 455/522 |
| 2012/0103768 | A1 | 5/2012 | Bachman et al. | |
| 2012/0270581 | A1* | 10/2012 | Brunel ................... | H04W 16/10 455/501 |
| 2013/0015953 | A1 | 1/2013 | Hsu | |
| 2013/0115992 | A1* | 5/2013 | Pantelidou ............ | H04W 52/02 455/517 |
| 2013/0136072 | A1 | 5/2013 | Bachmann | |
| 2013/0190024 | A1* | 7/2013 | Hayase .................. | H04B 15/00 455/501 |
| 2013/0344903 | A1 | 12/2013 | Li et al. | |
| 2014/0086093 | A1* | 3/2014 | Liu ........................ | H04W 24/02 370/252 |
| 2015/0341898 | A1 | 11/2015 | Xu | |
| 2016/0014718 | A1 | 1/2016 | Mysore Balasubramanya | |
| 2017/0171392 | A1* | 6/2017 | Yuan ..................... | H04L 5/0055 |
| 2020/0029302 | A1* | 1/2020 | Cox ....................... | H04W 68/02 |
| 2020/0169956 | A1* | 5/2020 | Sun ....................... | H04L 12/2803 |
| 2020/0229095 | A1* | 7/2020 | Shrestha ................ | H04W 8/24 |
| 2020/0367194 | A1 | 11/2020 | Berggren | |
| 2021/0044393 | A1 | 2/2021 | Beale | |
| 2021/0176729 | A1* | 6/2021 | Liu ........................ | H04W 68/02 |

FOREIGN PATENT DOCUMENTS

| | | |
|---|---|---|
| CN | 106851547 A | 6/2017 |
| EP | 2369883 A1 | 9/2011 |
| EP | 2844010 A1 | 3/2015 |
| EP | 2866504 A1 | 4/2015 |
| JP | 2001036457 A | 2/2001 |
| JP | 2008193592 A | 8/2008 |
| WO | 2014114240 A1 | 7/2014 |

OTHER PUBLICATIONS

Office Action and Search Report from corresponding Swedish Application No. 1851367-1, dated May 17, 2019, 8 pages.
Office Action and Search Report from corresponding Swedish Application No. 1950932-2, dated Jan. 27, 2020, 8 pages.
3GPP: Technical Specification Group Services and System Aspects: Architecture enhancements to facilitate communications with packet data networks and applications (Release 16); 3GPP TS 23.682; dated September 2018l 10 pages.
Huawei: "On support for UE-group wake-up signal"; 3GPP TSG RAN WG Meeting #94bis; R1-1810082; dated Oct. 2018; 6 pages.
Lenovo: "Consideration on wake up signal"; 3GPP TSG-RAN WG2 Meeting #103bis; R2-1814766; dated Oct. 2018; 4 pages.
Huawei: "Support of sb-groups for MWUS"; 3GPP TSG RAN WG1 Meeting #94; R1-1808121; dated Aug. 20, 2018; 3 pages.
Sony: "On supporting UE-group wake-up signal for MTC"; 3GPP TSG RAN WG2 Meeting #10; R2-1817085; Oct. 2018; 3 pages.
Qualcomm Inc.: "Discussion on UE-group wake-up signal for MTC"; 3GPP TSG RAN WG1 Meeting 394; R1-1809022; dated Aug. 2018; 5 pages.
Huawei et al.: "UE-Group based Wake-up signal"; 3GPP Draft; R2-1813915; vol. RAN WG2; dated Sep. 28, 2018; 3 pages.
Huawei: "Report of email discussion [99bis#35][NB-IOT/MTC] on wake-up signal", 3GPP Draft; R2-1713186; vol. RAN WG2; dated Nov. 17, 2017; 13 pages.
Qualcomm Incorporated: "Wake-up signal configurations and procedures"; 3GPP Draft; R1-1718141; vol. RAN WG1; dated Oct. 8, 2017; 7 pages.
Lenovo, Motorola Mobility, "Consideration on service-based UE grouping" [online], 3GPP TSG RAN WG2 Meeting #106 R2-1906208, Internet, May 2, 2019.
Sony, "On supporting UE group wake up signal" [online], 3GPP TSG RAN WG 2 Meeting #106 R2-1907053, Internet, May 2, 2019.
3GPPtsg_ran\WG2_RL2,TSGR2_101 Feb. 16, 2018 Ericsson, R2-1803065 "Unambiguous derivation of group paging identifier for response-driven paging" full text (4 pages).
Chinese Office Action dated Jul. 28, 2023 for Application Serial No. 201980064655.6 (5 pages).
European Opinion dated Apr. 14, 2022 for Application Serial No. 19879032.1 (8 pages).
European Supplemental Search Report dated Apr. 14, 2022 for Application Serial No. 19879032.1 (3 pages).
Japanese Office Action dated Feb. 28, 2023 for Application Serial No. 2021-517985 (8 pages).
Japanese Office Action dated Jun. 28, 2022 for Application Serial No. 2021-517985 (7 pages).
Korean Written Decision on Registration dated Jul. 27, 2022 for Application Serial No. 10-2021-7009491 (2 pages).
Korean Submission of Opinion dated Jan. 14, 2022 for Application Serial No. 10-2021-7009491 (6 pages).
International Preliminary Report on Patentability dated Apr. 27, 2021 for Application Serial No. PCT/SE2019/050991 (10 pages).

* cited by examiner

METHODS FOR ENHANCING PAGING OPERATIONS, RELATED WIRELESS DEVICES AND RELATED NETWORK NODES

The present disclosure pertains to the field of wireless communications. The present disclosure relates to methods for enhancing paging operations, related wireless devices and related network nodes.

BACKGROUND

The $3^{rd}$ Generation Partnership Project, 3GPP, has received commercial success for Long Term Evolution, LTE, Machine-Type Communication, MTC, and Narrowband Internet of things, NB-IoT. The number of deployed networks and the volume of connected devices are undergoing a steady growth.

To support this growth and to improve the communication procedures in general, LTE systems are enhanced in Release 16 to further improve the network operation and efficiency on improved downlink, DL, transmission efficiency and user equipment, UE, power consumption.

This includes investigating wake-up signal and paging operations for optimization for a plurality of UEs.

SUMMARY

There is a need for further optimization of the wake-up procedures related to paging of the UE.

Accordingly, there is a need for methods, wireless devices, and network nodes which enable improved paging operations.

A method performed in a wireless device, for enhancing paging operations with a network node is disclosed. The method comprises determining a group identifier based on a paging occurrence parameter, wherein the group identifier is indicative of a subset of wireless devices belonging to a paging group paged at a same paging occasion.

The present disclosure relates to a wireless device. The wireless device comprises a memory module, a processor module, and a wireless interface. The wireless device is configured to perform a method as disclosed herein.

Further, a method performed in a network node, for enhancing paging operations with a wireless device is disclosed. The method comprises determining a group identifier of the wireless device based on a paging occurrence parameter of the wireless device, wherein the group identifier is indicative of a subset of wireless devices belonging to a paging group paged at a same paging occasion. The method further comprises assigning the group identifier to the wireless device.

The present disclosure relates to a network node of a wireless communications network comprising a memory module, a processor module, and a wireless interface. The network node is configured to perform a method as disclosed herein.

It is an advantage of the present disclosure that the wireless devices are grouped based on a paging occurrence parameter related to the wireless device. This leads to an adaptable grouping wherein overhearing is reduced and thereby unnecessary power consumption is reduced.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1:
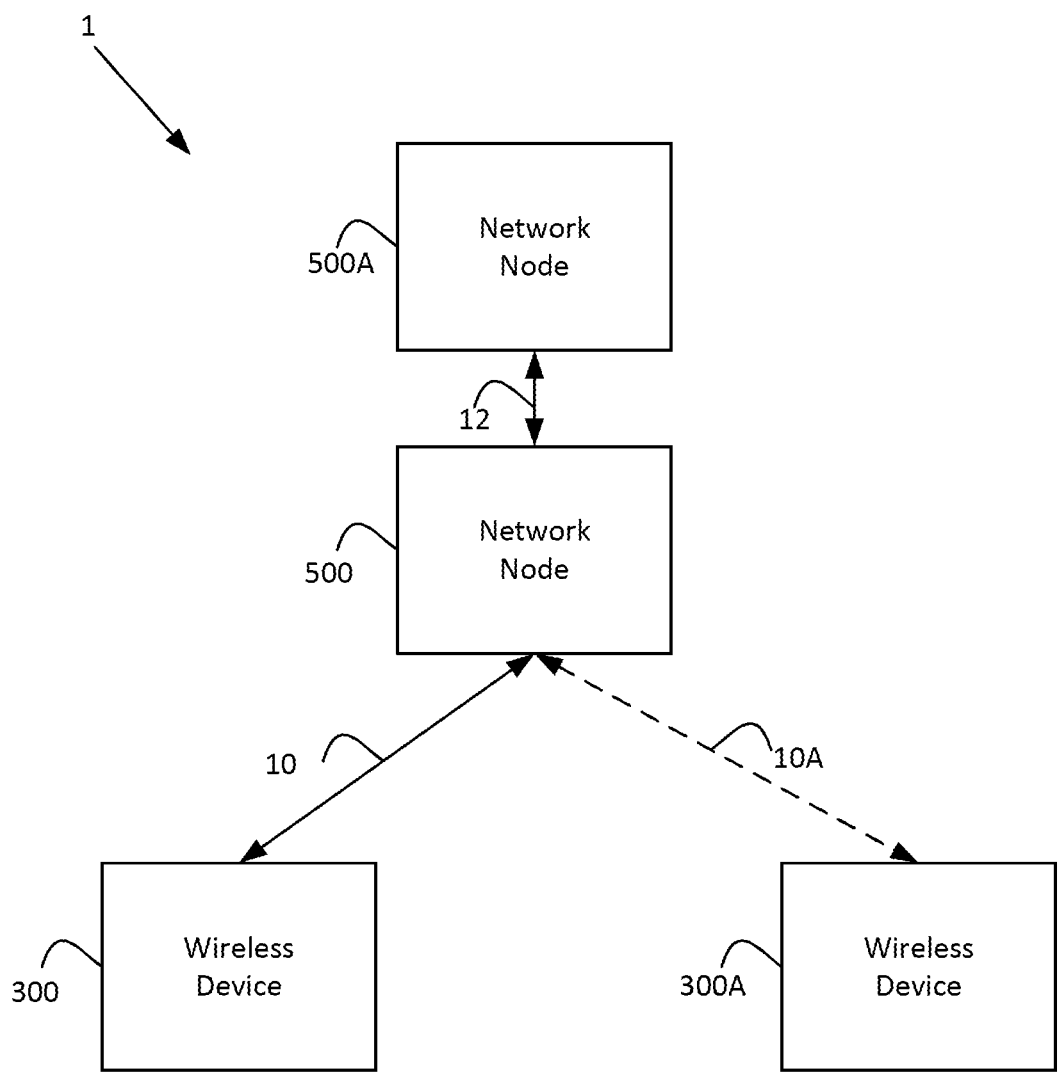
FIG. 1 is a diagram illustrating an exemplary wireless communication system comprising an exemplary network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation of the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which are essential to the understanding of the invention, while other details have been left out. Throughout, the same reference numerals are used for identical or corresponding parts.

FIG. 1 is a diagram illustrating an exemplary wireless communication system 1 comprising an exemplary network node 500 and an exemplary wireless device 300 according to this disclosure.

As discussed in detail herein, the present disclosure relates to a wireless communication system 1 comprising a cellular system, e.g. a 3GPP wireless communication system. The wireless communication system 1 comprises a wireless device 300 and/or a network node 500.

In one or more embodiments, the network node disclosed herein is a radio access network node operating in the radio access network, e.g. network node 500, such as a base station, an evolved Node B, eNB, and/or a gNB.

The wireless communication system 1 described herein may comprise one or more wireless devices 300, 300A, and/or one or more network nodes 500, such as one or more of a radio network node: a base station, an eNB, a global Node B and/or an access point.

The wireless communication system 1 may comprise one or more network nodes 500A which form part of a core network of the wireless communication system 1. In one or more embodiments, the network node disclosed herein is a core network node, e.g. network node 500A. For example, a core network node may comprise a Mobility Management Entity (MME), and/or an Access and Mobility management Function (AMF), and/or a Session Management Function (SMF).

Alternatively, or additionally, it may be appreciated that a core network node e.g. MME or AMF, SMF may be configured to perform a determination of a group identifier and transmit information indicative of the group identifier via the radio access node (e.g. via network node 500) to the wireless device.

In one or more embodiments, the network node disclosed herein comprises a radio access network node (e.g. network node 500) and/or a core network node (e.g. network node 500A). For example, network nodes 500, 500A may comprise one or more of: a base station, an eNB, a global Node B, an access point, and one or more of: an MME, an AMF, and an SMF.

A wireless device may refer to a mobile device and/or a user equipment, UE. Wireless device and user equipment, UE, may be used interchangeably in the present disclosure. Examples of wireless devices include a tablet, a mobile phone, and/or a portable electronic device.

The wireless device 300, 300A may be configured to communicate with the network node 500 via a wireless link (or radio access link) 10, 10A and/or a wired link. For example, network node 500 of the radio access network may be configured to communicate with network node 500A of the core network via a wired and/or wireless link 12.

Wake-up signal, WUS, operations in MTC release 15 do not employ a grouping mechanism. Although a network node 500 intends to page a wireless device 300, all the wireless devices 300, 300A allocated in the same paging occasion are woken-up and decode the paging message. The WUS is transmitted by the network node 500 to wake up all the wireless devices that monitor the associated paging occasion (PO).

For wireless devices in Idle mode, a network node 500A of the core network may trigger the transmission of a WUS by the radio access network node 500 to the wireless device.

In massive MTC situations, there may be many wireless devices sharing the PO and a wireless device 300 may be falsely woken up every time another wireless device 300A is being paged without being paged itself. This may be referred to as overhearing. This causes unnecessary power consumption for a wireless device (e.g. wireless device 300A) which is not intended to receive the paging information.

It is contemplated to perform a grouping of the wireless device based on e.g. a wireless device identifier, a coverage (e.g. normal coverage and/or extended coverage), Discontinuous Reception, DRX/eDRX, a gap configuration (e.g. Gap between wake-up signals and paging occasion), and services (e.g. quality of service, QoS, and/or application-layer requirements to support services).

However, grouping of the wireless devices based on a wireless device identifier is still a sub-optimal solution because this is fixed and not dynamically adaptable to the paging operations of each wireless device 300, 300A.

For example, let us assume a plurality of wireless devices 300 that belong to different groups (wake-up) are paged at the same time by the network node 500, and thus, all wireless devices or UEs belonging to any of the paged groups, where at least one wireless device is paged, wakes up unnecessarily which results in overhearing and unnecessary power consumption.

Figure 2:
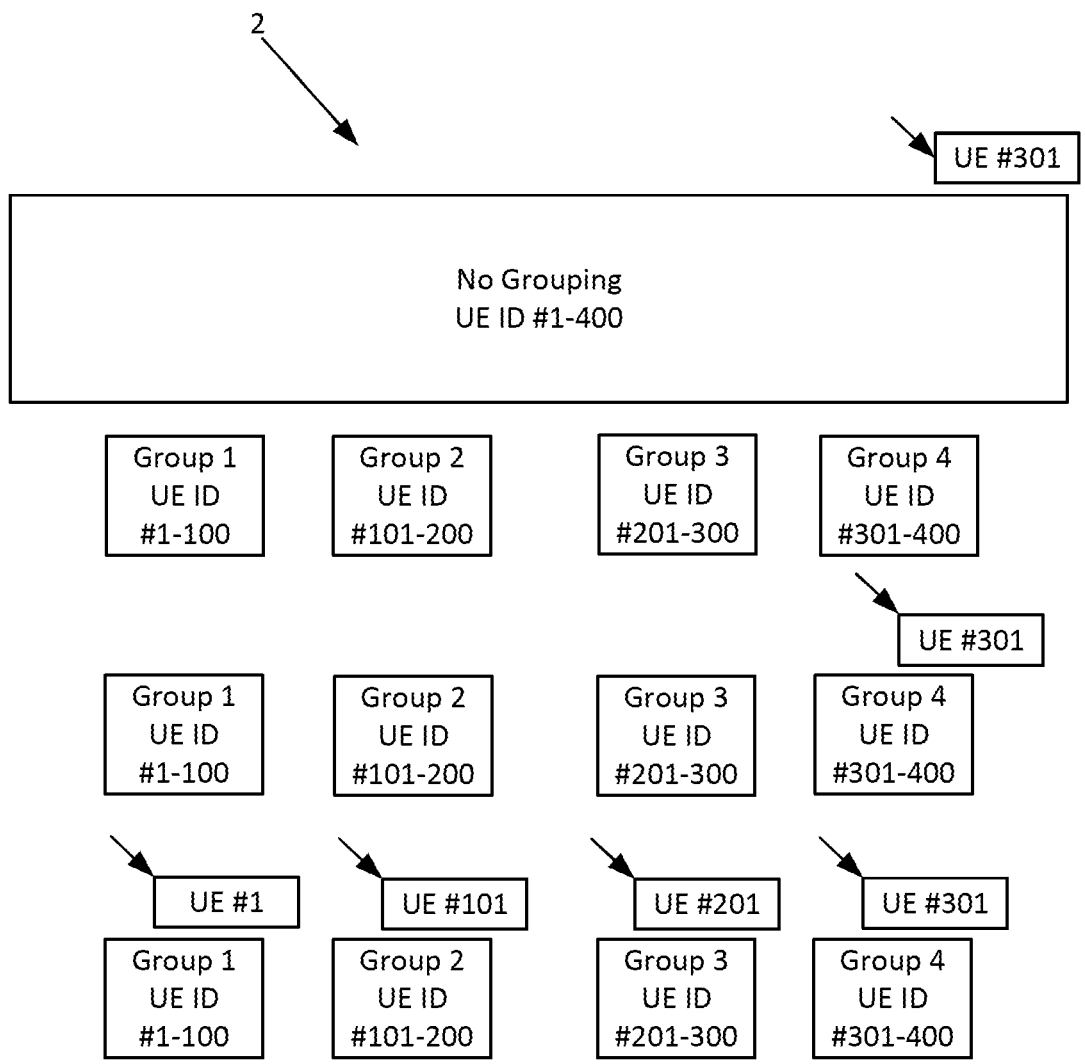
FIG. 2 is a diagram illustrating exemplary grouping mechanisms based on a wireless device identifier to illustrate a challenge addressed by one or more embodiments of the present disclosure.

This is illustrated in FIG. 2 where grouping based on the wireless device identifier, denoted as UE ID in FIG. 2. FIG. 2 shows a diagram 2 illustrating exemplary grouping mechanisms based on a wireless device identifier to illustrate a challenge addressed by one or more embodiments of the present disclosure. In this example, there are 400 wireless devices. In a legacy where no grouping mechanism is applied, it is similar as if all 400 wireless devices are assigned to the same group. This creates the undesirable situation that when a wireless device denoted UE #301 is paged as illustrated in FIG. 2, the other 399 wireless devices are woken up, monitoring a downlink control channel for the paging occasions, decoding the paging information and then only realizing that the paging is not intended for their use, thereby having unnecessary power consumption.

With the introduction of grouping, the wireless devices are grouped according to their wireless device identifier, for example, group 1 is assigned to wireless devices with UE ID ranging from 1 to 100, group 2 is assigned to wireless devices with UE ID ranging from 101 to 200, group 3 is assigned to wireless devices with UE ID ranging from 201 to 300, and group 4 is assigned to wireless devices with UE ID ranging from 301 to 400.

With such grouping based on a wireless device identifier, when wireless device denoted UE #301 is paged as illustrated in FIG. 2, only a part of the 400 wireless devices are triggered to wake-up, particularly the wireless devices of group 4.

Further, when four wireless devices are paged by a network node and each wireless device belongs to a different group, for example wireless devices denoted with UE #1, UE #101, UE #201, UE #301 as illustrated in FIG. 2, this results in waking every wireless device in every group and causing unnecessary overhearing to 396 wireless devices in this example.

This results in unnecessary power consumption for wireless devices other than the paged ones, which is the same as without grouping.

In other words, wireless devices that are frequently paged are likely to be allocated to the same group. Other wireless devices which are rarely paged are likely to be grouped together.

It is an advantage of the present disclosure that the illustrated problem is solved, inter alia, by grouping the wireless devices based on their paging occurrence according to one or more exemplary embodiments. This way, for example, in the situation illustrated in FIG. 2, the 4 wireless devices would belong to a same group which would limit the number of wireless devices unnecessarily woken up, and preparing for paging. As the number of wireless devices increases in a paging group, the network node (in the radio access network and/or in the core network) is capable of ensuring that the probability of overhearing within a group is maintained (e.g. not increased). In case the overhearing parameter (or the number of overhearing occurrences over a time period for a group, e.g. overhearing occurrence frequency for a group) gets too high then the network node may divide the group into smaller groups.

Figure 3:
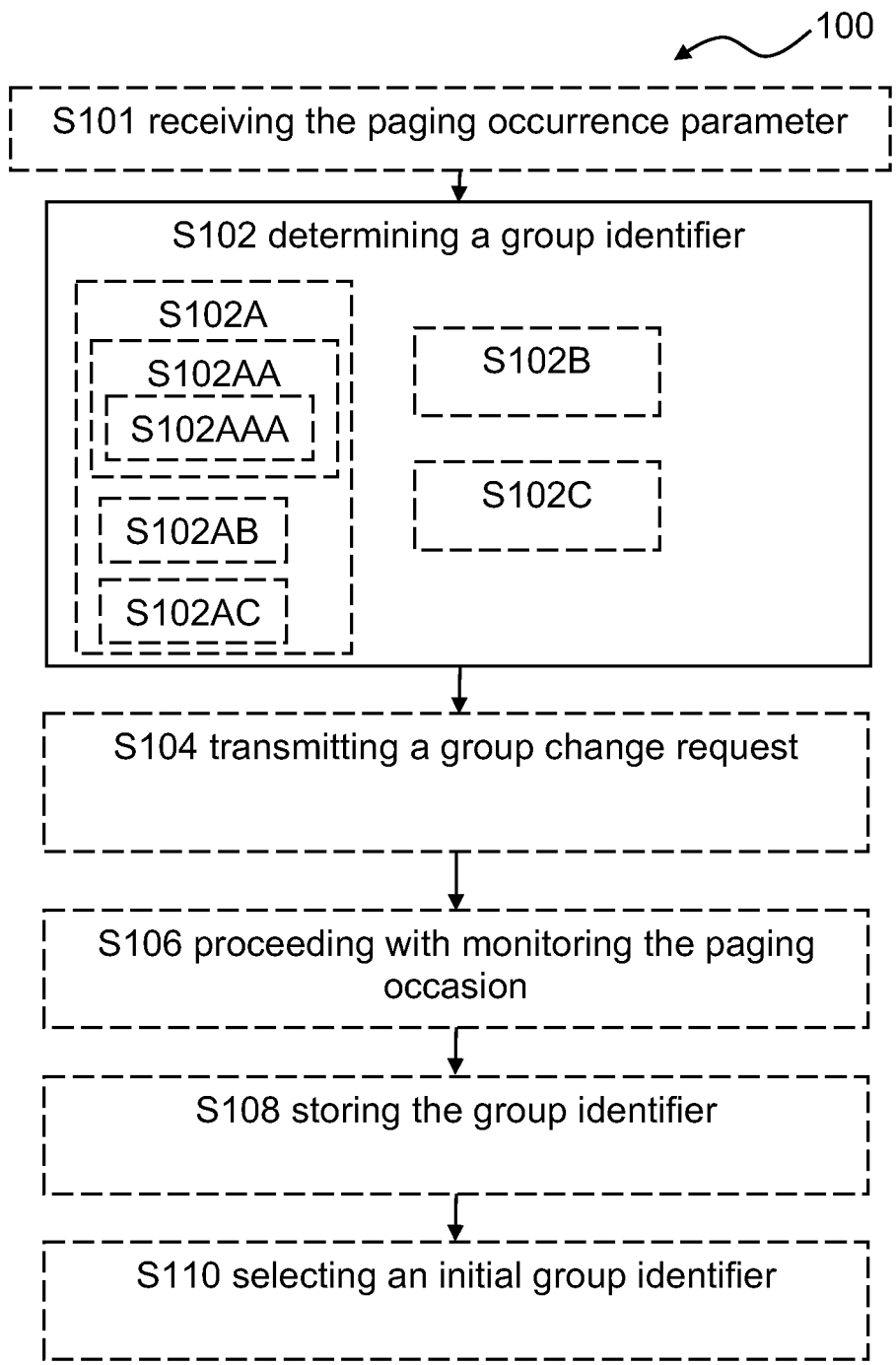
FIG. 3 is a flow-chart illustrating an exemplary method, performed in a wireless device, for enhancing paging operations with the network node according to this disclosure.

FIG. 3 is a flow-chart diagram of an exemplary method 100 performed by an exemplary wireless device (e.g. wireless device 300 of FIG. 1, and FIG. 5) according to the disclosure. The method 100 is performed for enhancing paging operations with a network node (e.g. a network node of the radio access network and/or a network node of the core network, e.g. a network node disclosed herein, e.g. network node 500, 500A), thereby for reducing power consumption at the wireless device.

The method 100 comprises determining S102 a group identifier based on a paging occurrence parameter. A paging occurrence may refer to an event where the wireless device (e.g. a wireless device in Idle mode, such as in RRC_Idle mode where RRC denotes Radio Resource Control) is paged by the network node (e.g. by a radio access network node, or by a core network node via a radio access network node) by first monitoring the channel for a wake-up signal, WUS, and if the group identifier of the wireless device is detected by the wireless device from a wake-up signal, then the wireless device continues monitoring the downlink control channel, and then decodes the paging information from a paging message on the downlink shared channel. As explained earlier, some wireless devices perform the paging procedure often as requested by the network node (of the radio access network and/or of the core network) due to the traffic experienced while other wireless devices perform less often the paging procedure as requested by the network node. For example, a frequency or load of DL traffic depends on the application, i.e. the interaction between an application server and an application client in the wireless device. It can be envisaged that the application server often needs to pull sensor data from the wireless device (for example due to user interaction with a web-interface). A paging occurrence may be seen as part of a paging occasion. For example, a paging occasion, PO, is a subframe where there may be a Paging-Radio Network Temporary Identifier, P-RNTI, transmitted by the network node on Physical Downlink Control Channel, PDCCH, (e.g. MTC Physical Downlink Control Channel, MPDCCH, and/or for NB-IoT on NB-IoT PDDCH, NPDCCH) addressing the paging message. A paging frame, PF, may correspond to radio frame, which may contain one or more paging occasion(s).

Paging occurrence parameter may refer to a parameter generated based on the number of paging occurrences of the wireless device over a time period, e.g. a parameter calculated based on the number of actual paging occurrences of the wireless device over a time period, and a parameter estimated over a time period based on data traffic pattern between the wireless device and the network node. For example, the paging occurrence parameter may be indicative of a frequency of paging occurrence for the wireless device (e.g. representing how often the wireless device is paged by the network based on actual and/or estimated paging occasions). For example, the paging occurrence parameter may be indicative of a paging history for the wireless device.

In one or more exemplary methods, the method 100 optionally comprises obtaining a paging occurrence parameter, and determining the group identifier based on the obtained paging occurrence parameter. For example, obtaining the paging occurrence parameter may comprise determining S102A the paging occurrence parameter based on a number of paging occurrences during a time window. For example, obtaining the paging occurrence parameter may comprise deriving the paging occurrence parameter based on an overhearing parameter. For example, obtaining the paging occurrence parameter may comprise receiving S101 the paging occurrence parameter from the network node.

In one or more exemplary methods, the method 100 comprises receiving S101 the paging occurrence parameter from the network node. For example, the wireless device may receive the paging occurrence parameter from a network node of the radio access network and/or a network node of the core network.

In one or more exemplary methods, the group identifier may be indicative of a subset of wireless devices belonging to a same paging group paged at a same paging occasion. A subset of wireless devices as disclosed herein may refer to a subset of wireless devices in one or more cells of a radio access network. The group identifier may be valid in an area larger than one cell. The wireless device may move around within a registered area (e.g. a tracking area, TA or several TAs). The paging escalation (e.g. in WUS) may be sent into the registered area as a final step in the escalation. In one or more exemplary methods, the subset of wireless devices may be determined at the network node based on a specified group parameter indicative of group size. The group identifier identifies uniquely a paging group. The group identifier may identify uniquely a group, referred to as a WUS group. The group identifier may be in the form of a number (e.g. an integer). According to one or more embodiments, the present disclosure allows the paging group to include wireless devices that are to be paged in the same paging occasion.

In one or more embodiments, a group (e.g. a WUS group) may be regarded as a subgroup (such as a paging subgroup).

In one or more embodiments, the method 100 comprises transmitting to the network node control signaling indicative of support of grouping functionality by the wireless device to network node.

In one or more exemplary methods, determining S102 the group identifier based on the paging occurrence parameter comprises determining S102A the paging occurrence parameter based on a number of paging occurrences during a time window. Stated differently, determining S102A the paging occurrence parameter may be based on a frequency of paging occurrence of the wireless device (e.g. how often the wireless device gets paged or is involved in a paging occasion). In one or more exemplary methods, determining S102A the paging occurrence parameter may be based on a paging probability of the wireless device (e.g. what is the likelihood that the wireless device gets paged or is to be involved in a paging occasion).

In one or more exemplary methods, determining S102A the paging occurrence parameter based on a number of paging occurrences during the time window comprises analyzing S102AA data traffic pattern between the wireless device and the network node (e.g. of the radio access network and/or of the core network) during the time window, and estimating S102AB the number of paging occurrences based on the analysis. In other words, analyzing S102AA data traffic pattern between the wireless device and the network node (e.g. of the radio access network and/or of the core network) may be performed by performing a learning procedure to identify a paging pattern of the wireless device. For example, the network node of the core network may analyze the data traffic pattern by analyzing the UL and/or DL traffic between the radio access network node and the wireless device. For example, the network node of the core network may analyze the data traffic pattern by determining a number of times that the S1 (or end to end data connections) is setup between the core network node and the wireless device. For example, when there is a data traffic between the wireless device and the network node (e.g. of the radio access network and/or of the core network), either the wireless device or the network node (e.g. of the radio access network and/or of the core network node) can identify a paging pattern (e.g. machine type traffic pattern). Identifying the paging pattern may be based on a learning procedure that can be locally performed in the wireless device and/or in the network node (e.g. of the radio access network and/or of the core network node).

In one or more exemplary methods, analyzing S102AA the data traffic pattern between the wireless device and the network node comprises identifying S102AAA a paging pattern of the wireless device based on a data traffic parameter indicative of the data traffic pattern between the wireless device and the network node. In one or more exemplary methods, a data traffic parameter may be indicative of a service (application-layer service) to be carried out by the wireless device, and/or traffic time of the data traffic experienced by the wireless device. For example, a data traffic parameter may be derived from a buffer status report. For example, a data traffic parameter may be derived based on a traffic profile (e.g. a traffic profile of 3GPP TS 23.682), and/or optionally identified based on traffic profile signaling with the network node. For example, a data traffic parameter may be derived based on a subscription associated with the wireless device, For example, a data traffic parameter may be derived based on a provisioned traffic pattern by an application server (e.g. using an application programming interface, API, between the application server and a core network node (e.g. Service Capability Exposure Function SCEF and/or a Network Exposure Function, NEF, node). For example, when an application server has provisioned the network node with specific traffic profile (see 3GPP TS 23.682), then the network node may use this information to determine an initial group identifier of the wireless device to be associated with a paging group with a similar traffic profile. The network node can provide the initial group identifier to the device e.g. at the initial registration.

In one or more exemplary methods, determining S102 the group identifier based on the paging occurrence parameter comprises determining S102C the group identifier based on an overhearing parameter. The overhearing parameter may be indicative of a number of overhearing occurrences, wherein an overhearing occurrence takes place when the wireless device has been woken up for paging occasions not intended for itself. For example, when the wireless device is progressively less or more paged in paging occasions, and may overhear more often, the wireless device may be configured to perform the determining S102 of the group identifier based on the overhearing parameter so as to update the group identifier. This allows the wireless device to be part of the appropriate group in terms of paging occurrence.

In one or more exemplary methods, determining S102 the group identifier based on the paging occurrence parameter comprises determining S102C the group identifier based on a group parameter indicative of a group size. A group parameter as disclosed herein, may be indicative of a group size, such as a maximum allowable number of wireless device(s) per paging group. In the present disclosure, the term "group" and "paging group" are used interchangeably. For example, in a situation where the initial group identifier is selected based on the wireless device identifier, and where the network node of the radio access network may even broadcast information that the initial group identifier is used, the wireless device is configured to determine an initial group identifier based on a group parameter indicative of a group size. The network node may be configured to transmit or broadcast how many initial groups (e.g. N initial groups) are used in an area (e.g. a public land mobile network, PLMN or Tracking Area). The wireless device may be configured to determine the group identifier based on N (e.g. based on the wireless device identifier UE-ID and the group parameter N: UE-id mod N where mod denotes a modulo operation).

This is advantageous to reduce overhearing. For example, when a group gets too large, it may increase the likelihood that too many wireless devices are woken up too frequently without actually being paged. According to one or more embodiments, the present disclosure provides an optimization that determines or tracks the paging occurrence parameter (e.g. how frequently a group (any wireless in the group) is paged and the individual wireless device paging history) so as to adjust the group to the group size (e.g. by splitting the group into smaller groups based on the disclosed optimization).

In one or more exemplary methods, determining S102A the paging occurrence parameter based on a number of paging occurrences during a time window comprises determining S102AC the number of actual paging occurrences during the time window. For example, the number of actual paging occurrences during the time window (e.g. over a time period) may be determined based on the paging history of the wireless device, which the wireless device may keep track of. For example, the paging occurrence parameter may be indicative of a paging probability associated with the wireless device.

In one or more exemplary methods, determining S102A the paging occurrence parameter may be performed based on a paging escalation parameter indicative of actual paging escalation. A wireless device experiencing much Idle mode mobility would cause the WUS to be transmitted into many more cells than a wireless device with low or no idle mode mobility. When the WUS is transmitted into a larger area, then more wireless devices would experience overhearing. Idle mode mobility may also be used as an input parameter to derive the paging escalation parameter and it may be used when determining the group identifier according to step S102. For example, the paging escalation parameter may be based on the Idle mode mobility of the wireless device (e.g. Idle mode mobility occurrence over a time window). For example, the wireless device may have estimated the paging escalation parameter to be e.g. 5 based on Idle mode mobility, this factor can be used as input to the estimation of the paging occurrences parameter.

In one or more exemplary methods, determining S102 the group identifier based on the paging occurrence parameter comprises calculating S102B based on the number of actual paging occurrences during the time window and the estimated number of paging occurrences. For example, calculating S102B may comprise averaging between the number of actual paging occurrences during the time window and the estimated (e.g. learned) number of paging occurrences. This may advantageously lead to an even distribution of the wireless devices over groups (or as even distribution as possible), and it may avoid the cost of overhearing for the wireless devices which are not targeted by the paging. For example, the group identifier, Group ID, may be calculated in the following exemplary manner:

$$\text{Group ID}:n=\text{function}[P2, P1] \quad (1)$$

Wherein function denotes a function (e.g. an average function, e.g. a weight-based function), P1 denotes a first paging occurrence parameter based on (e.g. equal to) a number of actual paging occurrences during a time window, P2 denotes a second paging occurrence parameter based on (e.g. equal to) an estimated number of paging occurrences, through learning procedure of S102AA, during a time window.

The following table provides exemplary calculation for determining (e.g. updating) the group identifier.

TABLE 1

| Wireless device identifier | P2 (page/ hour) | Initial group identifier | P1 (page/ hour) | Updated group identifier |
|---|---|---|---|---|
| UE #1 | 0.1 | 1 | 1 | 1 |
| UE #2 | 1 | 2 | 10 | 3 |
| UE #3 | 10 | 3 | 5 | 2 |
| UE #4 | 100 | 4 | 100 | 4 |
| UE#5 | 5 | 3 | 50 | 4 |

In Table 1 above, the grouping does not only consider the actual paging occurrence per wireless device (i.e. actual paging during a time window), but it also considers the estimated number of paging occurrences (e.g. based on learning process, service type, and/or traffic type).

In one or more exemplary methods, the method 100 comprises transmitting S104 a group change request to the network node. For example, the group change request comprises the determined group identifier, e.g. as a suggestion from the wireless device to the network node. For example, the group request may comprise control signalling indicative of the determined group identifier (e.g. indicative of a group with a lower paging occurrence parameter, or of a higher paging occurrence parameter). For example, the group change request may be transmitted to a core network node over Network Access Stratum (NAS) signalling, e.g. during a Tracking Area Update (TAU) procedure. For example, the group change request may be transmitted to a radio network node via RRC. For example, when the wireless device is less paged while belonging to a more frequently paged group, the wireless device would incorrectly be triggered to decode the paging information in paging occasions that are not necessary for the wireless device. This will create unnecessary overhearing for the wireless device. When a number of overhearing takes place (e.g. the overhearing parameter is determined to be unsatisfactory, e.g. above a threshold), the wireless device can transmit a group change request comprising an updated group identifier, the message may e.g. include the overhearing parameter indicative of a number of overhearing occurrences during a time window. Then the network node (e.g. of the radio access network and/or of the core network) may perform the determination of paging occurrence parameter and determining an updated group identifier (e.g. by selecting a lower group identifier, e.g. in a step manner, when the group identifiers are arranged according to an increasing order of paging occurrence parameter). A group identifier may be in form of a number. Selecting a lower group identifier may be seen as selecting a group identifier which has a lower number than the number of the previous group identifier of the wireless device.

In one or more exemplary methods, the method 100 comprises proceeding S106 with monitoring the paging occasion when the determined group identifier is received from the network node. In one or more exemplary methods, proceeding S106 may comprise waking up based on a wake-up signal, WUS, and then proceeding with the paging procedure.

In one or more exemplary methods, the method 100 comprises monitoring one or more paging occasions in accordance with the determined group identifier.

In one or more exemplary methods, the method 100 comprises storing S108 the group identifier in a wireless device context. The group identifier may be stored in both the wireless device and the network node (e.g. of the radio access network and/or of the core network). When the wireless device is in RRC_Inactive mode, the group identifier may be stored in the network node (e.g. the radio access network node). When the wireless device is in RRC_Idle mode (and Connection Management state=Idle, CM_Idle) the group identifier may be stored in the network node (e.g. of the core network), such as an Access and Mobility Function, AMF, and/or a Mobility Management Element, MME in the wireless device context. When the wireless device is in RRC_Idle mode, the group identifier may be stored in the network node of the core network.

In one or more exemplary methods, storing S108 may comprise storing the group identifier and optionally a learning function as determined based on the analysis of the data traffic. In other words, the wireless device context (e.g. UE context) may comprise the group identifier and optionally a learning function as determined based on the analysis of the data traffic. For example, when the wireless device moves from one cell to another during RRC_Connected mode, the wireless device context is transferrable according to one or more embodiments of this disclosure to the new cell. Once the wireless device is released (RRC Connection Release), the group identifier may be updated as an information element, IE, in a release message from the network node to the wireless device, and the new/updated group identifier may be stored in the wireless device context (e.g. UE Context). When the wireless device is released to RRC_Inactive mode, the wireless device context may be maintained in the network node (e.g. of the radio access network). When the wireless device is released to RRC_Idle mode, the wireless device context (including the group identifier) may be stored in a core network node, e.g. Access and Mobility Function, AMF, and/or MME.

In one or more exemplary methods, the group identifier is arranged according to the paging occurrence parameter of the wireless device. In one or more exemplary methods, the group identifier may be arranged so that a group identifier represented by a lower number reflects a paging group with the wireless devices with less paging occasions and a group identifier represented by a higher number reflects a paging group with wireless devices with higher number of paging occasions. In other words, a higher number (e.g. an integer) as group identifier is for a paging group that is frequently paged while the lowest number (e.g. an integer) as group identifier is for a paging group with the least frequently paged.

In one or more exemplary methods, the method 100 comprises selecting S110 an initial group identifier based on a wireless device identifier. A wireless device identifier may comprise a UE identifier (e.g. international mobile subscriber identity, IMSI,) or a temporary identifier (e.g. temporary mobile subscriber identity, TMSI). For example, in an initial connection when the paging occurrence for the wireless device is unknown (possibly because the wireless device has not yet been paged and possibly because the traffic is unknown), the wireless device can be initially grouped based on the wireless device identifier and may select an initial group identifier to be updated when one or more paging occasions have been experienced by the wireless device.

In one or more exemplary methods, a plurality of groups comprises one or more initial groups (wherein each initial group is identified with an initial group identifier) and one or more paging groups (wherein each paging group is identified with a group identifier). Initial group identifiers may be transmitted by the network node of the core network e.g. via NAS signaling or broadcasted by the network node of the radio access network via system information. Group identifiers are determined based on paging occurrence parameter. Initial group identifiers may be determined based on the wireless device identifier. For example, initial group identifiers 1-4 may be assigned based on the wireless device identifier while group identifiers 5-12 may be assigned based on the paging occurrence parameter, e.g.: 5 refers to the least active paging group and 12 refers to the most active paging group. For example, when the wireless device initially connects to the network node, neither the wireless device nor the network node knows the wireless data traffic pattern. The wireless device and the network node can each derive an initial group identifier based on the wireless device identifier. Alternatively, for example, the initial group identifier may be a specific group identifier which is the same for all the wireless devices at initial connection or may be selected based on an even distribution amongst a predefined or preferred group. The initial group identifier may comprise an already existing group identifier. Alternatively, the initial group identifier may comprise a group identifier which does not exist yet.

In one or more exemplary methods, the method 100 comprises selecting an initial group identifier may be based on a provisioned traffic pattern by an application server (e.g. using an application programming interface, API, between the application server and a core network node (e.g. Service Capability Exposure Function SCEF and/or a Network Exposure Function, NEF, node). For example, when an application server has provisioned the network node with specific traffic profile (see 3GPP TS 23.682), then the network node can use this information to determine the group identifier of the wireless device to be associated with a paging group with similar traffic profile and provide the thus-determined group identifier to the wireless device. It may advantageous when the wireless device and the network node can identify the group identifier without any specific group signaling, such as by determining the group identifier based on the wireless device identifier.

In one or more exemplary methods, the method 100 comprises performing the determining S102 of the group identifier when a change criterion is fulfilled. The change criterion may comprise that an overhearing parameter (e.g. the number of overhearing occurrences during a time window) is above a change threshold. The overhearing parameter may be indicative of a number of overhearing occurrences, where the wireless device has been woken up for paging occasions not intended for itself. For example, when the wireless device is progressively less or more paged in paging occasions, and may overhear more often, the wireless device may be configured to perform the determining S102 of the group identifier based on the paging occurrence parameter and/or the overhearing parameter so as to update the group identifier. This allows the wireless device to be part of the appropriate group in terms of paging occurrence.

In one or more exemplary methods, the method 100 comprises performing the determining S102 of the group identifier periodically. A group identifier can e.g. be updated at any time the wireless device has performed any uplink/downlink traffic communication and returns to Idle mode. It could be periodic sensor upload or periodic registrations or registrations due to mobility.

In one or more exemplary methods, determining S102 the group identifier of the wireless device based on the paging occurrence parameter of the wireless device comprises determining the paging occurrence parameter based on a paging probability associated with the wireless device over the time window.

Based on the group identifier, the wireless device can monitor WUS in the assigned radio resource in conjunction with the Paging Occasion (PO) according to its DRX cycle.

Figure 4:
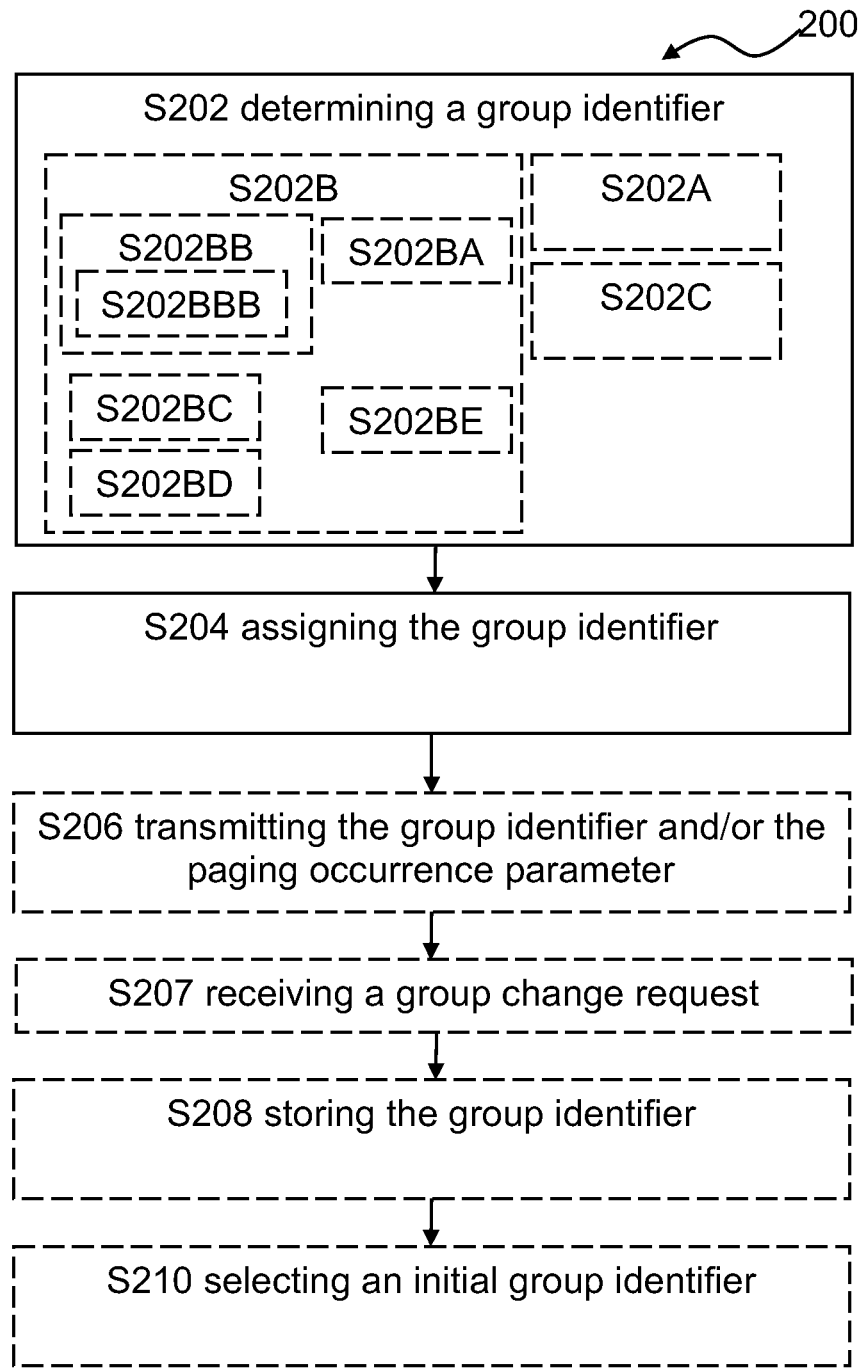
FIG. 4 is a flow-chart illustrating an exemplary method, performed in a network node of a wireless communication system, for enhancing paging operations with a wireless device according to this disclosure.
Figure 6:
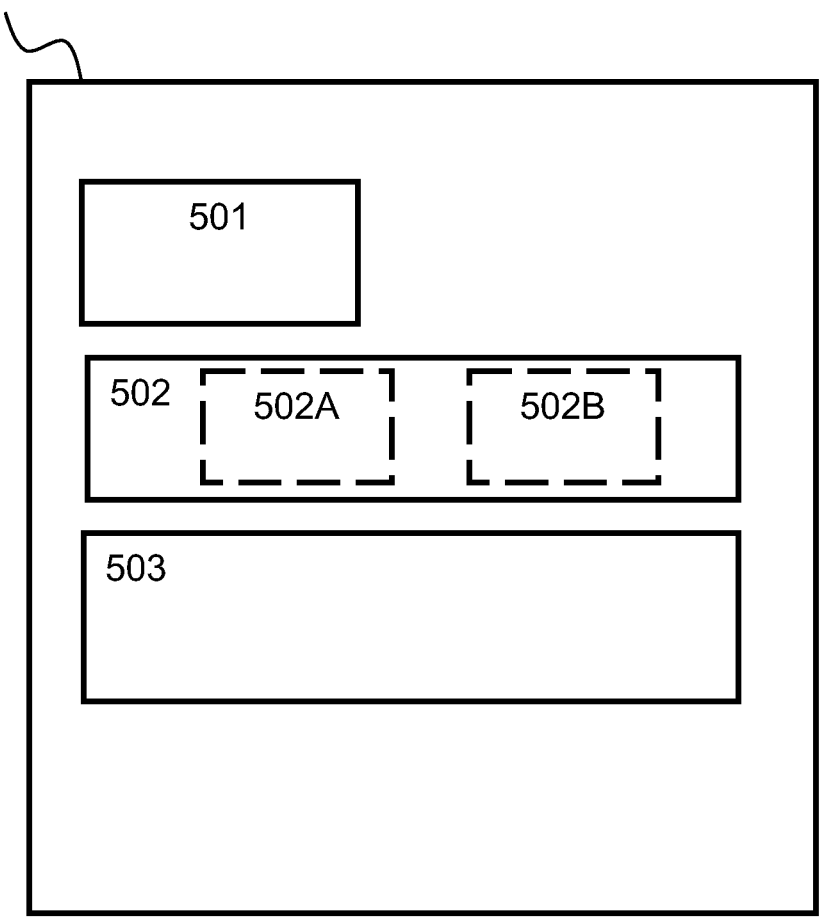
FIG. 6 is a block diagram illustrating an exemplary network node according to this disclosure.

FIG. 4 is a flow-chart diagram of an exemplary method 200 performed by an exemplary network node according to the disclosure (e.g. network node 500, 500A of FIGS. 1 and 6). The network node may comprise a radio access network node and/or a core network node. The method 200 is performed for enhancing paging operations with a wireless device and to use WUS to target a paging group. The method 200 may be seen as a method for grouping wireless devices in a paging group, and/or in a WUS group.

The method 200 comprises determining S202 a group identifier of the wireless device based on a paging occurrence parameter of the wireless device. Paging occurrence parameter may refer to a parameter generated based on the number of paging occurrence of the wireless device over a time period, e.g. a parameter calculated based on the number of actual paging occurrences of the wireless device over a time period, and a parameter estimated over a time period based on a data traffic pattern between the wireless device and the network node. For example, the paging occurrence parameter may be indicative of a frequency of paging occurrences for the wireless device (e.g. representing how often the wireless device is paged by the network based on actual and/or estimated paging occasions). For example, the paging occurrence parameter may be indicative of a paging history for the wireless device. The network node may be configured to maintain or hold the paging history of each wireless device in Idle mode.

In one or more exemplary methods, the group identifier is indicative of a subset of wireless devices belonging to a same paging group paged in a same paging occasion. The group identifier identifies uniquely a subset of wireless devices belonging to a same paging group. According to one or more embodiments, the present disclosure allows the network node to page a targeted group of wireless devices, i.e. a paging group of wireless devices that are to be paged in the same paging occasion.

In one or more exemplary methods, the method 200 comprises assigning S204 the group identifier to the wireless device. For example, the network node is configured to associate (e.g. in a table) the wireless device with the corresponding group identifier as obtained in S202.

In one or more exemplary methods, the method 200 comprises transmitting S206 the group identifier and/or the paging occurrence parameter to the wireless device (e.g. for the wireless device to listen after). For example, the paging occurrence parameter may be received in S101 of FIG. 3. For example, when the wireless device is less paged while belonging to a more frequently paged group, the wireless device would incorrectly be triggered to decode the paging information transmitted by the network node in paging occasions that are not necessary for the wireless device. This will create unnecessary overhearing for the wireless device. The network node may determine an updated group identifier. For example, when the group identifiers (and/or paging groups) are arranged according to an increasing order of paging occurrence parameter and the paging occurrence parameter indicates a decrease in the number of paging occurrences during a time window, the network node may determine an updated group identifier by lowering the group identifier to a lower number and may assign the wireless device to a new paging group with a group identifier having a lower number. For example, paging groups are ordered from group identifier 1 to group identifier 5 along an increasing order of a paging occurrence parameter, and when a current group identifier is 3, the network node is configured to update this group identifier to e.g. 2 according to a lowered paging occurrence parameter. The network node may transmit the updated group identifier to the wireless device.

The network node (e.g. of the core network, e.g. MME) may transmit the group identifier (e.g. the WUS group number) in a paging request message to the network node of the radio access network (e.g. eNB) when the network node (e.g. of the core network) page the wireless device. The radio access network can use the group identifier (e.g. the WUS group number) to activate WUS signal in the specific radio resource. With this approach, the logic in the eNB and UE can be kept simple.

In one or more exemplary methods, the method 200 comprises receiving S207 a group change request from the wireless device. Thereby, the wireless device indicates to the network node its intention to change paging group. For example, when the wireless device is less paged while belonging to a more frequently paged group, the wireless device would incorrectly be paged in paging occasions that are not necessary for the wireless device. This will create unnecessary overhearing for the wireless device. When a number of overhearing takes place, the wireless device can transmit a group change request comprising an updated group identifier and e.g. an overhearing parameter. Then, the network node receiving the group change request may perform the determination of a paging occurrence parameter and determining an updated group identifier. In one or more exemplary methods, the group change request may comprise the group identifier from the wireless device. The group identifier determined by the network node may result in being the same as the received group identifier.

In one or more exemplary methods, determining S202 the group identifier based on the paging occurrence parameter comprises determining S202A the group identifier based on a group parameter indicative of a group size. A group parameter as disclosed herein, may be indicative of a group size, such as a maximum allowable number of wireless device(s) per group. This is advantageous to reduce overhearing. For example, when a group gets too large, it may increase the likelihood that too many wireless devices are woken up too frequently without actually being paged. According to one or more embodiments, the present disclosure proposes an optimization that determines or tracks the paging occurrence parameter (e.g. how frequently a group (any wireless device in the group) is paged and the individual wireless device paging history) so as to adjust the group to the group size (e.g. by splitting the group into smaller groups based on the disclosed optimization).

In one or more exemplary methods, determining S202 the group identifier of the wireless device based on the paging occurrence parameter of the wireless device comprises determining S202B the paging occurrence parameter based on a number of paging occurrences of the wireless device during a time window. Stated differently, determining S102A the paging occurrence parameter may be based on a frequency of paging occurrences of the wireless device (e.g. how often the wireless device gets paged or is involved in a paging occasion). The network node is capable of tracking the paging occurrence parameter per wireless device.

In one or more exemplary methods, determining S202B the paging occurrence parameter of the wireless device based on a number of paging occurrences of the wireless device during the time window comprises analyzing S202BB data traffic pattern between the wireless device and the network node during the time window, and estimating S202BC the number of paging occurrences based on the analysis. In other words, analyzing S202BB data traffic pattern between the wireless device and the network node may be performed by performing at the network node a learning procedure to identify a paging pattern of the wireless device. For example, when there is a data traffic between the wireless device and the network node, either the wireless device or the network node can identify a paging pattern (e.g. machine type traffic pattern). Identifying the paging pattern may be based on a learning procedure that can be locally performed in the wireless device and/or in the network node (of the radio access network and/or of the core network).

In one or more exemplary methods, analyzing S202BB the data traffic between the wireless device and the network node comprises identifying S202BBB a paging pattern of the wireless device based on one or more of a data traffic parameter indicative of the data traffic between the wireless device and the network node. In one or more exemplary methods, a data traffic parameter may be indicative of a service (application-layer service) to be carried out by the wireless device, traffic time of the data traffic experienced by the wireless device. For example, a data traffic parameter may be derived from a buffer status report. For example, a data traffic parameter may be derived based on a traffic profile (e.g. a traffic profile of 3GPP TS 23.682), and/or optionally identified based on traffic profile signaling with the network node. For example, a data traffic parameter may be derived based on a provisioned traffic pattern by an application server (e.g. using an application programming interface, API, between the application server and a core network node (e.g. Service Capability Exposure Function SCEF and/or a Network Exposure Function, NEF, node). For example, when an application server has provisioned the network node with specific traffic profile (see 3GPP TS 23.682), then the network node may use this information to determine an initial group identifier of the wireless device to be associated with a paging group with similar traffic profile. The network node can provide the initial group identifier to the device e.g. at an initial registration. In one or more exemplary methods, determining S202B the paging occurrence parameter based on a number of paging occurrences during a time window comprises determining S202BA the number of actual paging occurrences during the time window. For example, the number of actual paging occurrences during the time window (e.g. over a time period) may be determined based on the paging history of the wireless device, which the network node may keep track of.

In one or more exemplary methods, determining S202B the paging occurrence parameter may comprise determining S202bE the paging occurrence based on a paging escalation parameter indicative of actual paging escalation needed to receive a paging response from the wireless device. A wireless device experiencing much Idle mode mobility would cause the WUS to be transmitted into many more cells than a wireless device with low or no idle mode mobility. If the WUS is transmitted into a larger area then more devices would experience overhearing. Idle mode mobility may also be used as an input parameter/factor when determining the group identifier according to S202. For example, the number of cells the WUS is transmitted in before the UE is reached is 5, the paging escalation parameter may be e.g. 5, the number of actual paging occurrences could be multiplied with a factor of 5 as input to the paging occurrence parameter.

In one or more exemplary methods, determining S202 the group identifier based on the paging occurrence parameter comprises calculating S202C based on the number of actual paging occurrences during the time window and the estimated number of paging occurrences. For example, calculating S102B may comprise averaging between the number of actual paging occurrences during the time window and the estimated (e.g. learned) number of paging occurrences. This may advantageously lead to an even distribution of the wireless devices over groups (or as even distribution as possible), and it may avoid the cost of overhearing for the wireless devices which are not targeted by the paging. For example, the group identifier, Group ID, may be calculated in the following exemplary formula (1) above.

In one or more exemplary methods, the group identifier is arranged according to the paging occurrence parameter of the wireless device. In one or more exemplary methods, the group identifier may be arranged so that a group identifier represented by a lower number reflects a paging group with the wireless devices with less paging occasions and a group identifier represented by a higher number reflects a paging group with wireless devices with a higher number of paging occasions. In other words, a higher number (e.g. integer) as group identifier is for a paging group which is frequently paged, while the lowest number (e.g. integer) as group identifier is for a paging group with the least frequently paged.

In one or more exemplary methods, the method 200 comprises selecting S210 an initial group identifier based on a wireless device identifier. A wireless device identifier may comprise a UE identifier (e.g. international mobile subscriber identity, IMSI,) or a temporary identifier (e.g. temporary mobile subscriber identity, TMSI). For example, in an initial connection when the paging occurrence for the wireless device is unknown (possibly because the wireless device has not yet been paged and possibly because the traffic is unknown), the wireless device can be initially grouped based on the wireless device identifier and may select an initial group identifier to be updated when one or more paging occasions have been experienced by the wireless device. For example, selecting S210 an initial group identifier may be based on a provisioned traffic pattern by an application server (e.g. using an application programming interface, API, between the application server and a core network node (e.g. Service Capability Exposure Function SCEF and/or a Network Exposure Function, NEF, node). For example, when an application server has provisioned the network node with a specific traffic profile (see 3GPP TS 23.682), then the network node may use this information to determine an initial group identifier of the wireless device to be associated with a paging group with similar traffic profile. The network node can provide the initial group identifier to the device e.g. at an initial registration.

In one or more exemplary methods, the method 200 comprises storing S208 the group identifier in a wireless device context. The group identifier may be stored in the network node. When the wireless device is in RRC_Inactive, the group identifier may be stored in the network node (e.g. of the radio access network). When the wireless device is in RRC_Idle (and Connection Management state=Idle CM_Idle) the group identifier may be stored in a core network node, such as an Access and Mobility Function, AMF, and/or a Mobility Management Element, MME in the wireless device context.

In one or more exemplary methods, storing S208 may comprise storing the group identifier and optionally a learning function as determined based on the analysis of the data traffic. In other words, the wireless device context (e.g. UE context) may comprise the group identifier and optionally a learning function as determined based on the analysis of the data traffic.

In one or more exemplary methods, determining S202 the group identifier of the wireless device based on the paging occurrence parameter of the wireless device comprises determining the paging occurrence parameter based on a paging probability associated with the wireless device over the time window. For example, the network node can determine the paging probability based on the subscription information associated with the wireless device, and/or traffic characteristics provisioned by SCS/AS via SCEF (e.g. Communication Pattern), and/or paging statistics based on actual number of pages performed e.g. triggered by Mobile Terminated data or NAS signaling. For example, the paging occurrence parameter may be indicative of a paging probability associated with the wireless device.

In one or more exemplary methods, the method comprises assigning a group identifier to a wireless device, e.g. corresponding. to a WUS group for a UE in Idle mode. Initially, the network node may have no statistics on paging events and can then only use subscription and/or provisioned traffic characteristic information to determine the appropriate group or group identifier. However, over time the network node of the core network can gather statistics and can use this information to re-assign the UE to a group with e.g. lower or higher paging probability.

When assigning the wireless device to a group, the network node (e.g. MME node) also needs to consider the number of devices assigned to each group. Initial assignment to a group may be performed during an Attach procedure and/or a TAU.

For example, some wireless device may have a paging probability that may vary over time, or that differs between different time periods. For example, some wireless devices may need to be reached more frequently during e.g. 8-9 in the morning, and for the rest of the day more seldom, or not at all. For example, the paging probability for certain time periods may be considered when grouping the UEs.

In one or more exemplary methods, the method comprises updating the group identifier (e.g. the grouping) based on e.g. paging event statistics and group size, which can be done during the TAU procedure, or other NAS procedure, e.g. a scheduling request triggered by paging, and/or RRC signaling, e.g. RRC Connection release.

In one or more exemplary methods, a number of groups may be up to 20, e.g. up to 16, e.g. up to 8, e.g. between 4-8. For example, the MME may manage the UE grouping and provide the group identifier (e.g. (0 . . . 7)) to the UE, if the UE has indicated support for WUS grouping in the Attach or TAU request.

In one or more exemplary methods, there may be two groups, e.g. with a high paging probability and a low paging probability respectively. In one or more exemplary methods, there may be groups in the range from 4-8. For UE's in RRC idle mode, the MME may handle the grouping for WUS and UE assignment via NAS signaling.

Figure 5:
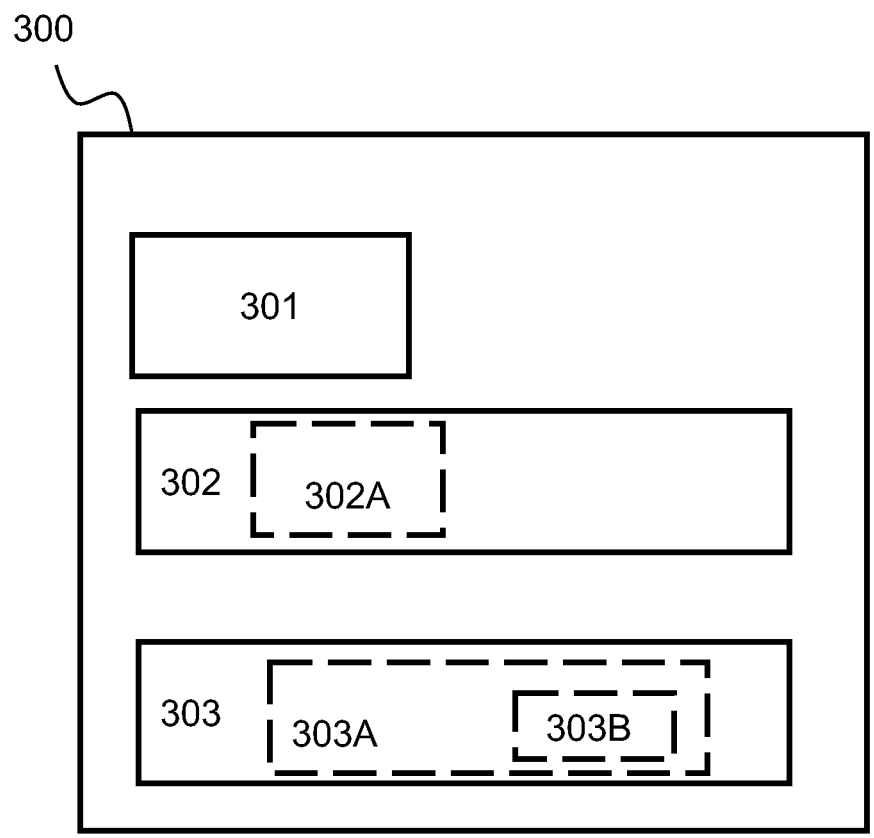
FIG. 5 is a block diagram illustrating an exemplary wireless device according to this disclosure.

FIG. 5 is a block diagram of an exemplary wireless device 300 according to the disclosure. The present disclosure relates to a wireless device 300. The wireless device 300 comprises a memory module 301, a processor module 302, and a wireless interface 303. The wireless device 300 is configured to perform a method as disclosed herein (e.g. in FIG. 3).

The wireless device 300 is configured to communicate with a network node, such as the network node disclosed herein, using a wireless communication system. The wireless interface 303 is configured for wireless communications via a wireless communication system, such as a 3GPP system, such as a 3GPP system supporting MTC and/or NB-IoT communications.

The wireless device 300 is configured to determine, via the processor module 302 (e.g. via a determiner module 302A) a group identifier based on a paging occurrence parameter, optionally by performing any of the steps S102A, S102AA, S102AAA, S102AB, S102AC, S102B, S102C, S104, S106, S108, and S110 of FIG. 3.

The wireless device 300 may be configured to transmit, via the wireless interface 303, a group change request to the network node, which may comprise the group identifier.

The wireless device 300 may be configured to receive from the network node, via the wireless interface 303, a group identifier determined by the network node.

The wireless interface 303 may comprise a receiver module 303A comprising a wake-up receiver 303B for processing a wake-up signal for wireless devices identified by a group identifier of a paging group paged in the same paging occasion. When processed according to one or more embodiments of this disclosure, the wake-up signal allows to target a wireless device 300 which is configured to only monitor the wake-up signals with the low power wake-up receiver 303B, until it is triggered to power up the full receiver module 303A to decode the paging information.

The processor module 302 is optionally configured to perform any of the operations disclosed in FIG. 3. The operations of the wireless device 300 may be embodied in the form of executable logic routines (e.g., lines of code, software programs, etc.) that are stored on a non-transitory computer readable medium (e.g., the memory module 301) and are executed by the processor module 302.

While the described functions and operations may be implemented in software, such functionality may as well be carried out via dedicated hardware or firmware, or some combination of hardware, firmware and/or software.

The memory module 301 may be one or more of a buffer, a flash memory, a hard drive, a removable media, a volatile memory, a non-volatile memory, a random access memory (RAM), or another suitable device. In a typical arrangement, the memory module 301 may include a non-volatile memory for long term data storage and a volatile memory that functions as system memory for the processor module 302. The memory module 301 may exchange data with the processor module 302 over a data bus. Control lines and an address bus between the memory module 301 and the processor module 302 may also be present (not shown in FIG. 5). The memory module 301 is considered a non-transitory computer readable medium.

FIG. 6 shows a block diagram of an exemplary network node 500, 500A according to the disclosure. The present disclosure relates to a network node 500, 500A of a wireless communication system. Examples of a network node include a radio access network node, a base station, an evolved NodeB, and/or an access point.

The network node 500, 500A comprises a memory module 501, a processor module 502, and a wireless interface 503. The network node 500, 500A is configured to perform any of the methods disclosed herein, such as any of the methods shown in FIG. 4.

The network node 500, 500A is configured to determine (e.g. via the processor module 502) a group identifier based on a paging occurrence parameter (e.g. via a determiner module 502A), and to assign the group identifier to the wireless device (e.g. via an assigner module 502B).

The network node 500, 500A is configured to optionally perform any of the steps S202A, S202B, S202BB, S202BBB, 2102BA, S202BC, S202BD, S202BE, S202C, S206, S207, S208, and S210 of FIG. 4.

The network node 500, 500A may be configured to receive, via the wireless interface 503, a group change request from the wireless device, which may comprise the group identifier.

The network node 500, 500A may be configured to transmit to the wireless device, via the wireless interface 303, a group identifier determined by the network node.

The wireless interface 503 is configured for wireless communications via a wireless communication system, such as a 3GPP system, such as a 3GPP system with MTC and/or NB-IoT communications.

The processor module 502 is optionally configured to perform any of the operations disclosed in FIG. 4. The operations of the network node 500, 500A may be embodied in the form of executable logic routines (e.g., lines of code, software programs, etc.) that are stored on a non-transitory computer readable medium (e.g., the memory module 501) and are executed by the processor module 502.

Furthermore, the operations of the network node 500, 500A may be considered a method that the network node 500 is configured to carry out. Also, while the described functions and operations may be implemented in software, such functionality may as well be carried out via dedicated hardware or firmware, or some combination of hardware, firmware and/or software.

The memory module 501 may be one or more of a buffer, a flash memory, a hard drive, a removable media, a volatile memory, a non-volatile memory, a random access memory (RAM), or another suitable device. In a typical arrangement, the memory module 501 may include a non-volatile memory for long term data storage and a volatile memory that functions as system memory for the processor module 502. The memory module 501 may exchange data with the processor module 502 over a data bus. Control lines and an address bus between the memory module 501 and the processor module 502 may also be present (not shown in FIG. 6). The memory module 501 is considered a non-transitory computer readable medium.

In RAN WG2 #105bis, UE-grouping aspects for WUS are discussed. In R2-1903418, the paging probability is highlighted as a differentiator between different UEs and could be used in order to reduce false wake-up (or overhearing cost). Furthermore, it is proposed that the core network (CN) can be involved when configuring WUS sub-grouping, since the CN is capable of estimating the paging probability based on e.g. subscription. It may be appreciated that WUS grouping based on paging probability is beneficial for improving false wake-up probability for UEs which are not frequently paged, but may increase false wake-up probability for UEs which are frequently paged. The MME may be configured to provide information on UE paging probability. In other words, the MME may be configured to provide assistance information including paging probability information to a radio network node, e.g. eNB.

Figure 7A:
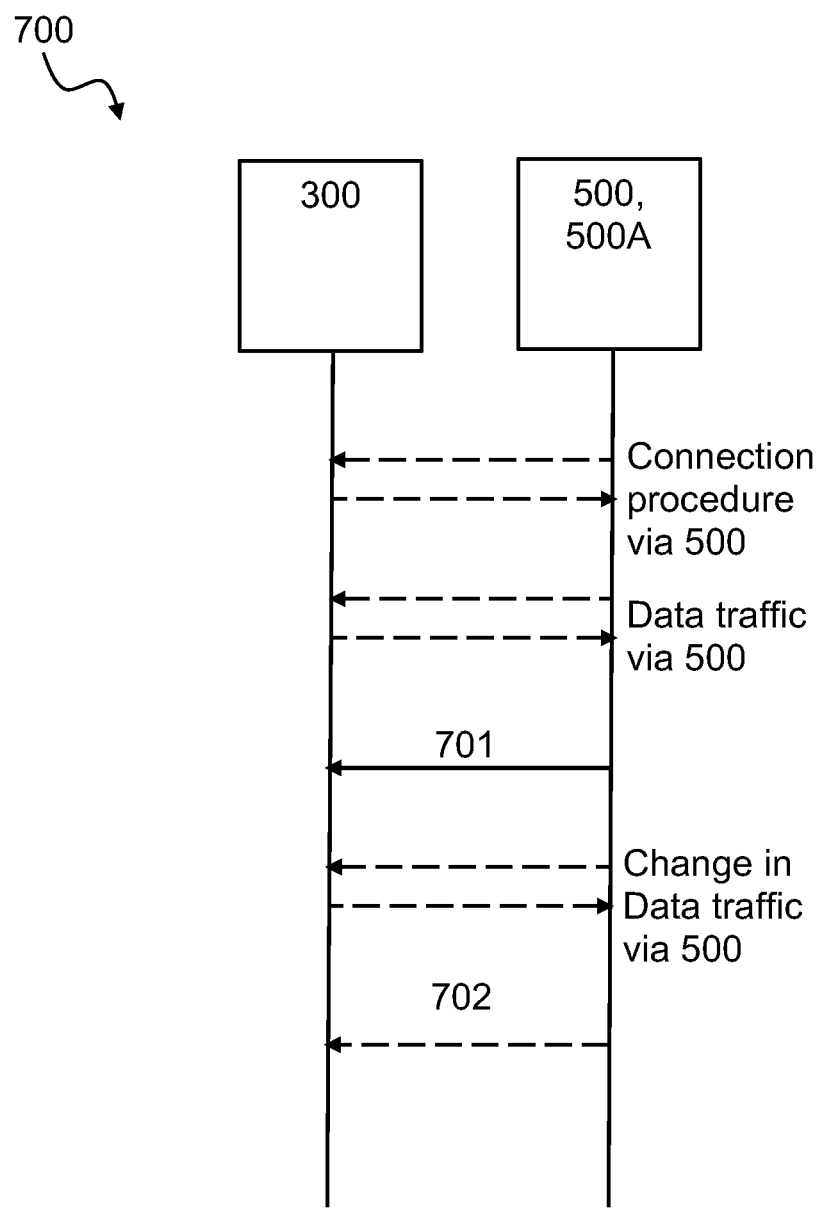
FIGS. 7A-7B are signalling diagrams illustrating exemplary communication between an exemplary wireless device and an exemplary network node.
Figure 7B:
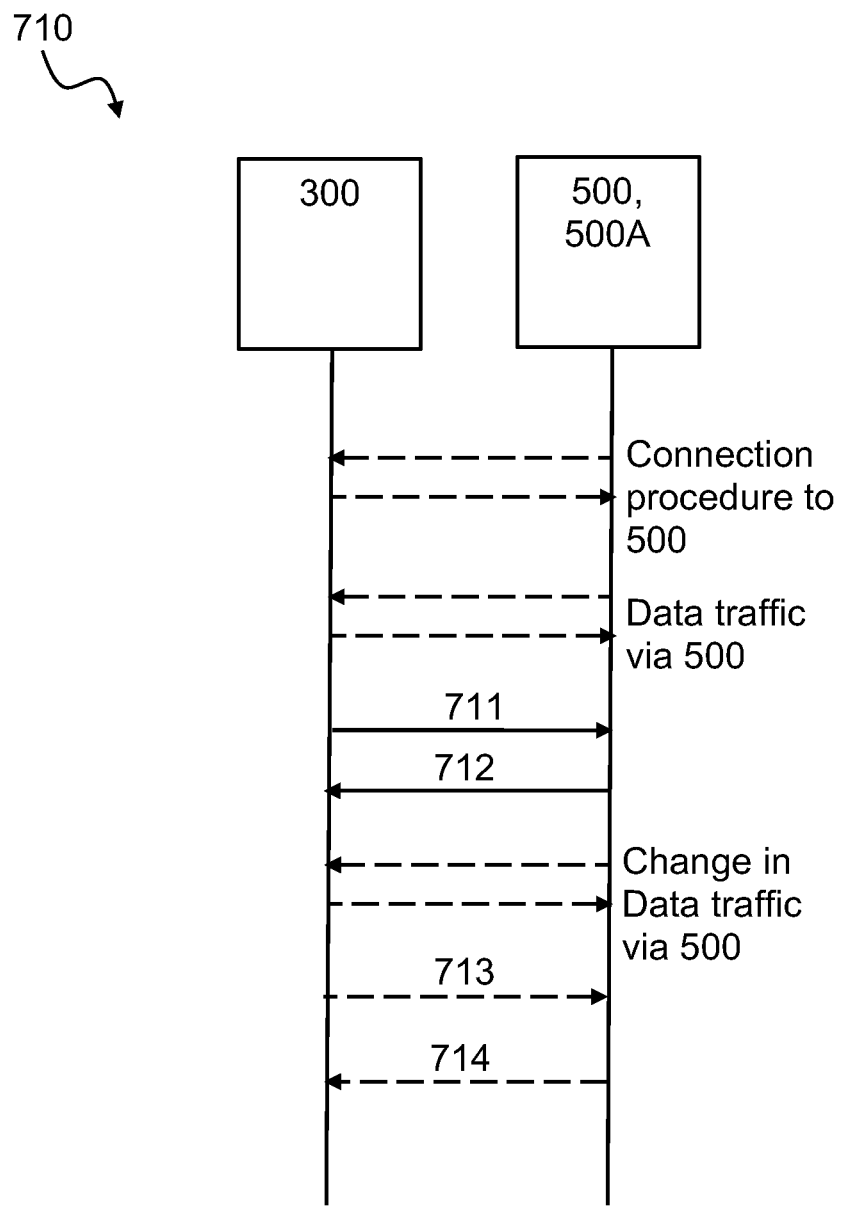

FIGS. 7A-7B are signaling diagrams 700, 710 illustrating an exemplary message exchange between an exemplary wireless device 300 and an exemplary network node 500.

In FIG. 7A, the network node 500, 500A and the wireless device 300 have performed a connection procedure. The network node 500, 500A determines a group identifier of the wireless device 300 based on a paging occurrence parameter of the wireless device 300 (as disclosed in S202 of FIG. 4).

The network node 500, 500A assigns the group identifier to the wireless device 300 (as disclosed in S204 of FIG. 4) and transmits the group identifier and/or the paging occurrence parameter in a message 701 to the wireless device 300 (as disclosed in S206 of FIG. 4). In one or more example embodiments, the message 701 may be carried by a paging request message from the network node 500A of the core network to the network node 500 of the radio access network, which then may transmit the group identifier and/or the paging occurrence parameter to the wireless device 300. In one or more example embodiments, the message 701 may be carried by system information from the network node 500 of the radio access network to the wireless device 300. For the case of RRC inactive mode, the network node 500 of the radio access network may assign the group identifier. The network node 500, 500A assigns the wireless device to a group represented by the group identifier, that is frequently paged when the data traffic pattern is indicative of a high load of traffic between the network node 500, 500A and the wireless device 300. Alternatively, the network node 500, 500A can assign the wireless device to a group that is less frequently paged when the data traffic pattern is indicative of less load of traffic between the network node 500, 500A and the wireless device 300.

The network node 500, 500A and the wireless device 300 may experience a change in the data traffic pattern, such as a decrease and/or an increase in the data traffic between the network node 500 and the wireless device 300.

The network node 500, 500A determines a group identifier (e.g. a new group identifier or an updated group identifier) of the wireless device 300 based on a paging occurrence parameter of the wireless device 300 (which is derived based on the data traffic pattern or change in data traffic). The network node 500 assigns the (e.g. new or updated) group identifier to the wireless device 300 and transmits the (e.g. new or updated) group identifier in an exemplary message 702 to the wireless device 300. The network node 500, 500A assigns the wireless device to a paging group represented by the (e.g. new or updated) group identifier, that is frequently paged when the data traffic pattern is indicative of an increased load of traffic between the network node 500 and the wireless device 300. Alternatively, the network node 500, 500A can assign the wireless device to a paging group that is less frequently paged when the data traffic pattern is indicative of a decreased load of traffic between the network node 500 and the wireless device 300. This results in adaptation of the paging group(s) controlled by the network, or the network node.

In FIG. 7B and in signaling diagram 710, the network node 500, 500A and the wireless device 300 have performed a connection procedure. The wireless device 300 is capable of determining a group identifier based on a paging occurrence parameter of the wireless device 300 (as disclosed in S102 of FIG. 3). The wireless device 300 is capable of determining an overhearing parameter and deciding based on the overhearing parameter that the group identifier is to be updated or determined again.

The wireless device 300 transmits to the network node 500, 500A a group change request 711 so as to request a change of group to the network node. The group change request 711 may be based on the group identifier and/or on the overhearing parameter determined by the wireless device.

Upon receiving of the group change request 711, the network node 500, 500A may consider the received group change request and may assign the group identifier to the wireless device 300 (as disclosed in S204 of FIG. 4).

The network node 500, 500A transmits an approval or the group identifier or provides an updated group identifier in a message 712 to the wireless device 300 (as disclosed in S206 of FIG. 4).

When the group change request 711 does not comprise the group identifier, the network node 500, 500A determines the group identifier of the wireless device 300 based on a paging occurrence parameter of the wireless device 300 and assigns the wireless device to a group represented by the group identifier accordingly.

When the wireless device is frequently paged (or when the data traffic pattern is indicative of a high load of traffic between the network node 500 and the wireless device 300), the network node 500, 500A assigns a corresponding group identifier.

The network node 500 and the wireless device 300 may experience a change in the data traffic pattern, such as a decrease and/or an increase in the data traffic between the network node 500 and the wireless device 300.

The wireless device 300 determines a group identifier based on a paging occurrence parameter of the wireless device 300 captured by the change in data traffic (as disclosed in S102 of FIG. 3). The wireless device 300 transmits to the network node 500 a group change request 713 so as to request a change of group to the network node. The group change request 713 may comprise an overhearing parameter and/or the group identifier determined by the wireless device.

Upon receiving of the group change request 713, the network node 500, 500A may consider the received group change request and may assign the group identifier to the wireless device 300 (as disclosed in S204 of FIG. 4).

The network node 500, 500A transmits an approval or the assigned group identifier in a message 714 to the wireless device 300 (as disclosed in S206 of FIG. 4).

When the group change request 711 does not comprise the group identifier, the network node 500, 500A determines a group identifier (e.g. a new group identifier or an updated group identifier) of the wireless device 300 based on a paging occurrence parameter of the wireless device 300 (which is derived based on the data traffic pattern or change in data traffic) and/or based on the overhearing parameter. The network node 500, 500A assigns the (e.g. new or updated) group identifier to the wireless device 300 and transmits the (e.g. new or updated) group identifier in a message 714 to the wireless device 300. The network node 500, 500A assigns the wireless device to a paging group represented by the (e.g. new or updated) group identifier that is frequently paged when the data traffic pattern is indicative of an increased load of traffic between the network node 500 and the wireless device 300. Alternatively, the network node 500, 500A can assign the wireless device to a paging group that is less frequently paged when the data traffic pattern is indicative of a decreased load of traffic between the network node 500 and the wireless device 300. This results in adaptation of the paging group(s) assisted by the wireless device.

The present disclosure provides aspects on supporting the operation of UE-group wake-up signal for Machine type communications (MTC).

For example, subgrouping of UEs within a WUS allows only a subgroup of UEs to be woken up by the WUS for a paging occasion (PO). The UE subgrouping operation reduces the number of UEs having to wake up unnecessarily to detect MPDCCH and decode PDSCH. Thus, it reduces UE power consumption for such UEs. The present disclosure may be based on how many WUS groups are supported.

False wake-up:

The purpose and an aspect of WUS is to reduce the number of false paging. Analyses show that additional grouping beyond the traditional IMSI based grouping is needed.

Figure 8:
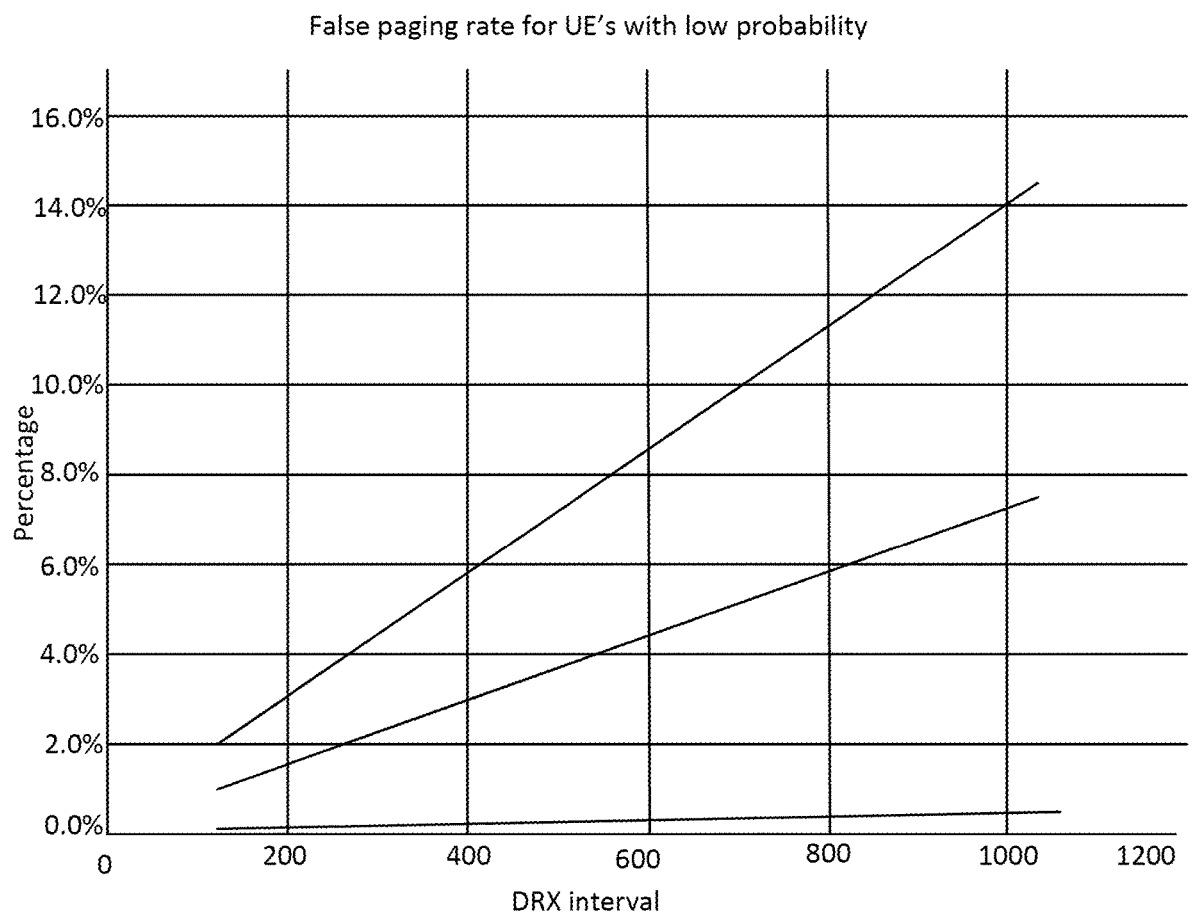
FIG. 8 is a graph illustrating the percentage of false paging vs the DRX interval.

FIG. 8 shows a graph illustrating the percentage of false paging vs the DRX interval. The graph shows the increase in false paging rate for UE's in group A, if no grouping is done. Even if the false paging rate for group A UE with 10.24 s DRX cycle is not very high, the increase is rather high from 0.1 permille, to almost 8 percent. The following table 1 is the input to the graph above.

TABLE 1

| False paging rate for UEs within same group only | | | | | |
|---|---|---|---|---|---|
| Paging interval | UE | DRX interval, T = "x"rf | | | |
| (Paging group) | distibution | 128 | 256 | 512 | 1024 |
| 1/day (groupA) | 100% | 0.074% | 0.148% | 0.296% | 0.593% |
| 1/hour (groupB) | 100% | 1.778% | 3.556% | 7.111% | 14.222% |
| 1/hour (groupB) | 50% | 0.889% | 1.778% | 3.556% | 7.111% |
| False paging rate for UE's in group A | | | | | |
| Paging intervall | UE | DRX intervall, T = "x"rf | | | |
| (Paging group) | distibution | 128 | 256 | 512 | 1024 |
| False page of 1/day (groupA), from group B | 50% | 0.926% | 1.852% | 3.704% | 7.407% |
| 1/hour (groupB) | 50% | — | — | — | — |

The analysis shows that further WUS grouping is needed beyond the traditional IMSI based grouping in order to reduce false wake-up and save UE power consumption.

For Idle mode, and for how to handle the paging using WUS, it can be the Core Network (MME) that has the information when a certain UE is to be paged (Idle mode). Also, the CN may be best suited to estimate the paging probability since it has or may have access to various information:

Subscription information

Traffic characteristics provisioned by SCS/AS via SCEF i.e. Communication Pattern, and/or Paging statistics based on actual number of pages performed e.g. triggered by MT data or NAS signaling.

The CN (MME) may be configured to assign the WUS group for a UE in Idle mode. Initially, the CN may have no statistics on paging events and can then only use subscription and/or provisioned traffic characteristic information. However, over time the CN gathers statistics and can use this information to reassign the UE to a group with e.g. lower or higher paging probability. When assigning UEs to the subgroups, the MME also needs to consider the number of devices assigned into each subgroup. In the extreme case, all UEs could be assigned the same group if it is only based on the type of service, then the subgrouping is not useful. A very high number of devices may generate high risk for false wake-up.

The MME may be configured to assign a UE to an initial WUS group during Attach and/or TAU. Some UE's may have a paging probability that may vary over time, or that it differs between different time periods. For example, some wireless devices may need to be reached more frequently during e.g. 8-9 in the morning, and for the rest of the day more seldom, or not at all. This can imply that also paging probability for certain time periods should be considered when grouping the UEs.

Paging probability for certain time periods maybe considered as paging occurrence parameter when grouping the UEs. Over time the CN may be configured to update the WUS grouping based on e.g. paging event statistics and subgroup size, which can be done during the TAU procedure, or other NAS procedure, e.g. SR triggered by Paging. For example, if the number of WUS groups are e.g. eight, then the MME can manage the UE grouping and provide the subgroup number (0 . . . 7) to the UE, if the UE has indicated support for WUS subgrouping in the Attach or TAU request.

The wireless device may be configured to indicate support of WUS grouping. Based on the WUS group number or group identifier, the UE can monitor WUS in the assigned radio resource in conjunction with the Paging Occasion (PO) according to its DRX cycle. The MME can include the WUS group number in paging message to the eNB when MME page the UE. RAN uses the WUS group number to activate WUS signal in the specific radio resource. There is no need to include more traffic information regarding the UE, than what is already defined, in the paging message sent to the eNB. With this approach the logic in the eNB and UE can be kept simple.

The network node may only need the WUS group number to activate the WUS correctly. For example, the MME assigns the WUS group number or group identifier, and the WUS group number is the only new information element sent to the eNB in the paging message from the MME (or AMF).

The WUS grouping feature may be designed to be able to group UE based on paging probability. The easiest way is to only support two groups, e.g. high and low probability). More realistically the number of groups could be in the range from 4-8. From an MME signalling and specification configuration point of view e.g. a value range of up to 16 groups could be defined, hence a 4 bit parameter would need to be defined. For UE's in RRC idle mode, the MME may be responsible for handling the WUS grouping and UE assignment via NAS signaling.

In some embodiments, the WUS grouping may not affect the paging strategy overall.

In this disclosure, it may be appreciated that analysis shows that further WUS grouping is needed beyond the traditional IMSI based grouping in order to reduce false wake-up and save UE power consumption. The CN node (MME) may be configured to assign the WUS group for a UE. The MME may be configured to assign a UE to a WUS group during Attach and/or TAU. Paging probability for certain time periods can be considered when grouping the UEs. Over time the CN node may be able to update the WUS grouping based on paging event statistics, which can be done during the TAU procedure, or other NAS procedure, e.g. SR triggered by Paging. The wireless device may be configured to indicate support of WUS grouping. For example, the eNB only needs the WUS group number to activate the WUS correctly. The MME may be configured to assign the WUS group number, and the WUS group number is the only new information element sent to the eNB in the paging message from the MME (or AMF).

Embodiments of methods and products (wireless devices and network nodes) according to the disclosure are set out in the following items:

Item 1. A method, performed in a wireless device, for enhancing paging operations with a network node, the method comprising:
determining (S102), based on a paging occurrence parameter, a group identifier, wherein the group identifier is indicative of a subset of wireless devices belonging to a same paging group paged at a same paging occasion.

Item 2. The method according to item 1, wherein determining (S102), based on a paging occurrence parameter, the group identifier comprises determining (S102A) the paging occurrence parameter based on a number of paging occurrences during a time window.

Item 3. The method according to item 2, wherein determining (S102A) the paging occurrence parameter based on a number of paging occurrences during the time window comprises analyzing (S102AA) data traffic pattern between the wireless device and the network node during the time window, and estimating (S102AB) the number of paging occurrences based on the analysis.

Item 4. The method according to item 3, wherein analyzing (S102AA) the data traffic pattern between the wireless device and the network node comprises identifying (S102AAA) a paging pattern of the wireless device based on a data traffic parameter indicative of the data traffic pattern between the wireless device and the network node.

Item 5. The method according to any of the previous items, wherein determining, based on the paging occurrence parameter, (S102) the group identifier comprises determining (S102C) the group identifier based on an overhearing parameter.

Item 6. The method according to any of items 2-5, wherein determining (S102A) the paging occurrence parameter based on a number of paging occurrences during a time window comprises determining (S102AC) the number of actual paging occurrences during the time window.

Item 7. The method according to any of items 3-6, wherein determining (S102), based on the paging occurrence parameter, the group identifier comprises calculating (S102B) the paging occurrence parameter based on the number of actual paging occurrences during the time window and the estimated number of paging occurrences.

Item 8. The method according to any of the previous items, the method comprising: transmitting (S104) a group change request to the network node, the group change request comprising the determined group identifier.

Item 9. The method according to any of the previous items, the method comprising:
proceeding (S106) with monitoring the paging occasion when the determined group identifier is received from the network node.

Item 10. The method according to any of the previous items, the method comprising storing (S108) the group identifier in a wireless device context.

Item 11. The method according to any of the previous items, wherein the group identifier is arranged according to the paging occurrence parameter of the wireless device.

Item 12. The method according to any of the previous items, the method comprising selecting (S110) an initial group identifier based on a wireless device identifier.

Item 13. The method according to any of the previous items, the method comprising receiving the paging occurrence parameter from the network node.

Item 14. A method, performed in a network node, for enhancing paging operations with a wireless device, the method comprising:
determining (S202), based on a paging occurrence parameter of the wireless device, a group identifier of the wireless device, wherein the group identifier is indicative of a subset of wireless devices belonging to a same paging group paged at a same paging occasion
assigning (S204) the group identifier to the wireless device.

Item 15. The method according to item 14, the method comprising: transmitting (S206) the group identifier and/or the paging occurrence parameter to the wireless device.

Item 16. The method according to any of items 14-15, wherein determining (S202), based on a paging occurrence parameter of the wireless device, the group identifier comprises determining (S202A) the group identifier based on a group parameter indicative of a group size.

Item 17. The method according to any of items 14-16, wherein determining (S202), based on the paging occurrence parameter of the wireless device, the group identifier of the wireless device comprises determining (S202B) the paging occurrence parameter based on a number of paging occurrences of the wireless device during a time window.

Item 18. The method according to item 17, wherein determining (S202B) the paging occurrence parameter of the wireless device based on a number of paging occurrences of the wireless device during the time window comprises analyzing (S202BB) data traffic between the wireless device and the network node during the time window, and estimating (S202BC) the number of paging occurrences based on the analysis.

Item 19. The method according to item 18, wherein analyzing (S202BB) the data traffic between the wireless device and the network node comprises identifying (S202BBB) a paging pattern of the wireless device based on one or more of a data traffic parameter indicative of the data traffic between the wireless device and the network node.

Item 20. The method according to any of items 17-19, wherein determining (S202B) the paging occurrence parameter based on a number of paging occurrences during a time window comprises determining (S202BA) the number of actual paging occurrences during the time window.

Item 21. The method according to any of items 17-20, wherein determining (S202), based on the paging occurrence parameter, the group identifier comprises calculating (S202C) the paging occurrence parameter based on the number of actual paging occurrences during the time window and the estimated number of paging occurrences.

Item 22. The method according to any of items 14-21, wherein the group identifier is arranged according to the paging occurrence parameter of the wireless device.

Item 23. The method according to any of items 14-22, wherein determining (S202) the group identifier of the wireless device based on the paging occurrence parameter of the wireless device comprises determining the paging occurrence parameter based on a paging probability associated with the wireless device over the time window.

Item 24. A wireless device (300) comprising a memory module (301), a processor module (302), and a wireless interface (303), wherein the wireless device (300) is configured to perform a method according to any of items 1-13.

Item 25. A network node (500) of a wireless communications network, the network node (500) comprising a memory module (501), a processor module (502), and a wireless interface (503), wherein the network node (500) is configured to perform a method according to any of items 14-23.

The use of the terms "first", "second", "third" and "fourth", "primary", "secondary", "tertiary" etc. does not imply any particular order but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-8 comprise some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the spirit and scope of the claimed invention. The specification and drawings are, accordingly to be regarded in an illustrative rather than restrictive sense. The claimed invention is intended to cover all alternatives, modifications, and equivalents.

The invention claimed is:

1. A method, performed in a wireless device, for enhancing paging operations with an associated network node, the method comprising:
determining, based on a paging occurrence parameter representative of a paging probability associated with the wireless device, a group identifier, wherein the group identifier is indicative of a subset of wireless devices belonging to a same paging group to be paged at a same paging occasion.

2. The method according to claim 1, wherein the paging occurrence parameter is indicative of a paging occurrence frequency associated with the wireless device.

3. The method according to claim 1, wherein the paging occurrence parameter is further representative of how often the wireless device is paged by the associated network node based on actual paging occurrences and/or estimated paging occurrences.

4. The method according to claim 1, wherein the determining, based on the paging occurrence parameter, the group identifier comprises determining the paging occurrence parameter based on a number of paging occurrences during a time window.

5. The method according to claim 4, wherein the determining the paging occurrence parameter based on a number of paging occurrences during the time window comprises analyzing data traffic pattern between the wireless device and the associated network node during the time window, and estimating the number of paging occurrences based on the analysis.

6. The method according to claim 5, wherein the analyzing the data traffic pattern between the wireless device and the associated network node comprises identifying a paging pattern of the wireless device based on a data traffic parameter indicative of the data traffic pattern between the wireless device and the associated network node.

7. The method according to claim 4, wherein the determining the paging occurrence parameter based on a number of paging occurrences during a time window comprises determining the number of actual paging occurrences during the time window.

8. The method according to claim 1, wherein the determining, based on the paging occurrence parameter, the group identifier comprises determining the group identifier based on an overhearing parameter.

9. The method according to claim 1, further comprising:
transmitting a group change request to the associated network node, the group change request comprising the determined group identifier.

10. The method according to claim 1, further comprising: proceeding with monitoring the paging occasion when the determined group identifier is received from the associated network node.

11. A method, performed in a network node, for enhancing paging operations with an associated wireless device, the method comprising:
determining, based on a paging occurrence parameter of the associated wireless device determined based on a paging probability associated with the associated wireless device over a time window, a group identifier of the associated wireless device, wherein the group identifier is indicative of a subset of associated wireless devices belonging to a same paging group to be paged at a same paging occasion; and
assigning the group identifier to the associated wireless device.

12. The method according to claim 11, the method comprising: transmitting the group identifier and/or the paging occurrence parameter to the associated wireless device.

13. The method according to claim 11, wherein determining, based on the paging occurrence parameter, the group identifier comprises determining, based on a group parameter indicative of a group size, the group identifier.

14. The method according to claim 11, wherein determining, based on the paging occurrence parameter of the associated wireless device, the group identifier of the associated wireless device comprises determining the paging occurrence parameter based on a number of paging occurrences of the associated wireless device during a time window.

15. The method according to claim 14, wherein determining the paging occurrence parameter of the associated wireless device based on a number of paging occurrences of the associated wireless device during the time window comprises analyzing data traffic between the associated wireless device and the network node during the time window, and estimating the number of paging occurrences based on the analysis.

16. The method according to claim 15, wherein analyzing the data traffic between the associated wireless device and the network node comprises identifying a paging pattern of the associated wireless device based on one or more of a data traffic parameter indicative of the data traffic between the associated wireless device and the network node.

17. The method according to claim 14, wherein determining the paging occurrence parameter based on a number of paging occurrences during a time window comprises determining the number of actual paging occurrences during the time window.

18. The method according to claim 11, wherein determining, based on the paging occurrence parameter, the group identifier comprises calculating the paging occurrence parameter based on the number of actual paging occurrences during the time window and the estimated number of paging occurrences.

19. The method according to claim 11, wherein the group identifier is arranged according to the paging occurrence parameter of the associated wireless device.

* * * * *